United States Patent [19]

Huebner et al.

[11] Patent Number: 4,528,467
[45] Date of Patent: Jul. 9, 1985

[54] COIL FOR DISK FILE ACTUATOR

[75] Inventors: Willi E. Huebner; Joseph P. Niemerg, both of San Jose, Calif.

[73] Assignee: International Business Machines Corporation, Armonk, N.Y.

[21] Appl. No.: 533,830

[22] Filed: Sep. 19, 1983

[51] Int. Cl.³ .............................................. H02K 41/02
[52] U.S. Cl. ...................................... 310/13; 310/27; 336/205; 336/223
[58] Field of Search ............................... 336/205, 223; 310/12–14, 27

[56] References Cited
U.S. PATENT DOCUMENTS

| | | | |
|---|---|---|---|
| 2,835,832 | 5/1958 | Efromson | 310/27 |
| 3,336,553 | 8/1967 | Cripps | 310/436 |
| 3,464,043 | 8/1969 | Benko et al. | 336/223 X |
| 3,783,180 | 1/1974 | Spicer | 336/205 X |
| 3,928,779 | 12/1975 | Zwarg et al. | 310/196 |

Primary Examiner—Donovan F. Duggan
Attorney, Agent, or Firm—Thomas R. Berthold; Richard E. Cummins

[57] ABSTRACT

An improved coil construction for the voice coil motor of a transducer positioning system of a magnetic disk drive results in increased coil strength while eliminating the tendency of volatile materials associated with either the assembly process or the coil insulation to be entrapped between turns. Insulated aluminum ribbon wire having a rectangular cross-section is edge wound on a mandrel with adjacent turns being bonded together and then subjected to a curing process. By subjecting the ribbon wire to a knurling process prior to winding, the flat surfaces of the ribbon wire are provided with a plurality of knurl prints on each side which extend between opposite edges of the wire in a direction transverse to the lengthwise dimension of the ribbon wire. After winding, the knurl prints serve as interturn vents to prevent entrapment of any volatile materials generated during the curing process. The construction substantially doubles the tensile strength of the coil.

6 Claims, 6 Drawing Figures

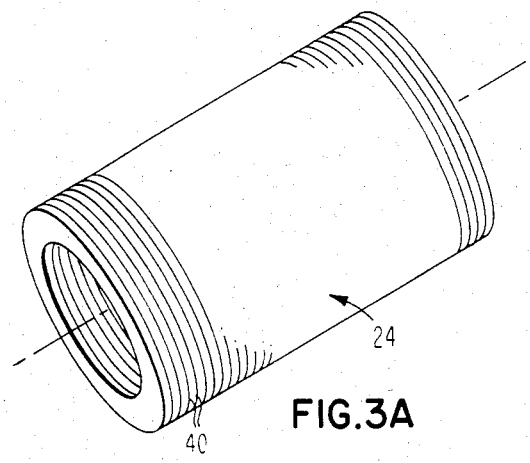
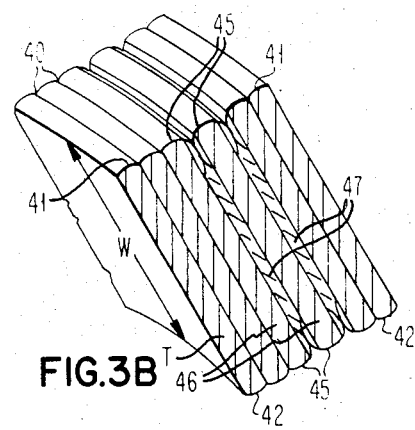
FIG.3A  FIG.3B
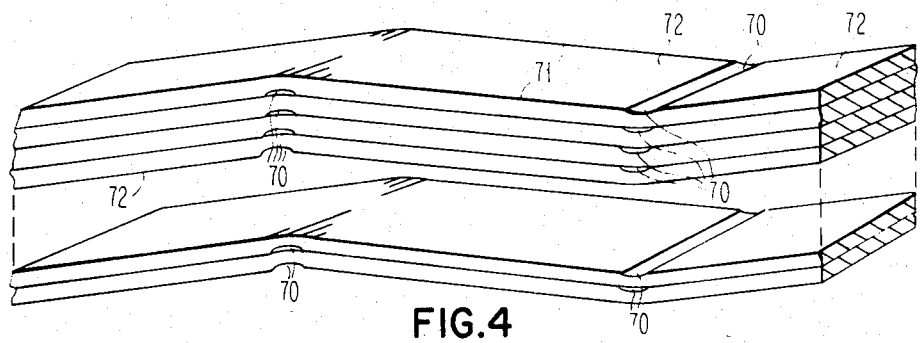
FIG.4
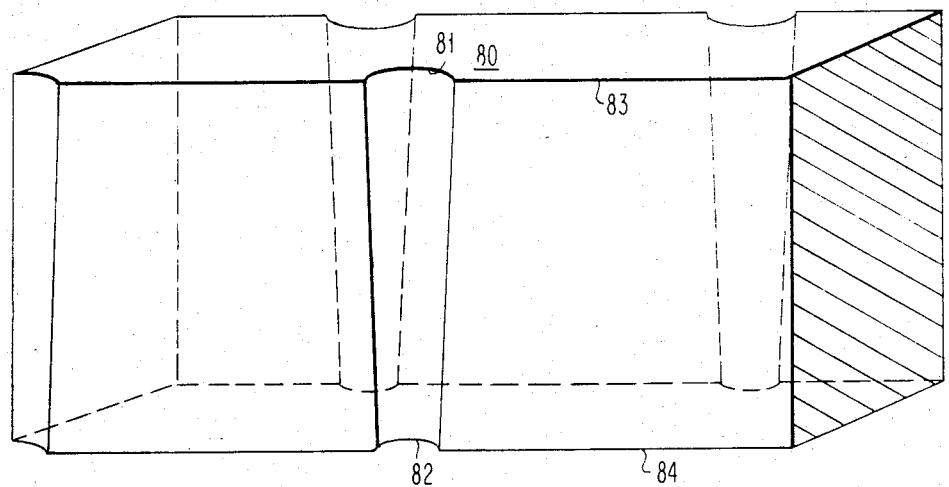
FIG.5

COIL FOR DISK FILE ACTUATOR

BACKGROUND OF THE INVENTION

1. Field of Invention

This invention relates in general to the construction of the coil for a voice coil motor (VCM), which is used in the transducer positioning system of a magnetic disk file and in particular to an improved coil construction in which the coil is wound from flat ribbon wire.

2. Description of the Prior Art

Magnetic disk files are employed in data processing systems for storing data on the surface of the disk in closely spaced concentric recording tracks. The file includes at least one magnetic transducer, which is moved to a selected recording track by means of a transducer positioning system. In many disk files, the transducer positioning system employs a voice coil motor (VCM) to cause movement of the head and carriage. The movement can involve both a seek mode and track following mode. In the seek mode, the positioning system supplies current to the coil of the VCM to move the transducer from a present track to a target track, in a time optimal fashion. Such movement may involve moving the transducer carriage a minimum of only one track or a few milliinches, in for example, 20 milliseconds. Alternately, the movement may involve a maximum distance of one thousand tracks or approximately 2 inches in an access time of, for example, 40 milliseconds. It will be appreciated that with such movements, the acceleration and deceleration forces on the coil become substantial during a seek operation, since a number of head assemblies are associated with the carriage being moved by the coil. Such an arrangement is shown in U.S. Pat. No. 4,190,870, particularly, FIG. 2, where the VCM is shown moving an assembly having four head arms. FIG. 1 of U.S. Pat. No. 4,144,466 illustrates a similar arrangement in greater detail. In the track following mode, similar forces may also be encountered.

Various coil constructions have been suggested in the prior art for improving the strength of the coil and to improve the overall performance of the VCM. One such construction is shown in U.S. Pat. No. 3,963,882. In other known coil configurations, flat "ribbon" wire is edge wound, such that the flat plane of the wire is substantially normal to the coil axis. "Ribbon" type wire has a substantially rectangular cross-section with an aspect ratio of width to thickness in the range of 3 to 1 to 10 to 1. Since substantial contact surface exists between adjacent turns, bonding these adjacent turns together by use of a suitable bonding agent produces a relatively strong coil. In one prior art arrangement, the coil wire is aluminum covered with a thin layer of polyimide insulation, and a polyimide type bonding agent is applied to the wire during the coil winding process. It has been found, however, that while the strength of the coil is substantially improved in most coils relative to other arrangements, a problem arises in some coils because solvents that are constituents of the bonding agent and by-products which are generated during the coil curing process become entrapped in the turns. The entrapment problem arises primarily because the bond between turns must be relatively thin so as to accommodate as many turns as possible in the space allotted for the coil, and because the depth of the bond, measured in a radial direction relative to the coil axis, is relatively deep. Since the solvent and by-products cannot escape from the coil during the curing process, there is an adverse effect on the coil strength which is not readily detectable until the coil is assembled in the VCM and fails because of poor tensile strength. The present invention provides a coil construction which overcomes the entrapment problem described above.

SUMMARY OF THE INVENTION

It has been found in accordance with the present invention that the entrapment problem associated with prior art edge wound ribbon type coils can be substantially eliminated, while at the same time providing a significant improvement in coil strength. The coil construction of the present invention is characterized by an edge wound insulated ribbon wire coil in which the ribbon wire is knurled prior to winding in a manner which produces a series of spaced vents along the lengthwise dimension of the wire, the individual knurl prints extending transverse to the lengthwise dimension with adjacent knurl prints being spaced apart a minimum distance to prevent entrapment of materials which might subsequently adversely affect the operation of the VCM.

It is therefore an object of the present invention to provide an improved construction for an edge wound ribbon wire coil.

Another object of the present invention is to provide an improved edge wound ribbon wire coil having increased strength.

A still further object of the present invention is to provide an edge wound ribbon wire coil in which entrapment of solvents and by-products of the bonding agents employed to bond adjacent turns together is substantially eliminated.

A still further object of the present invention is to provide a coil for a voice coil motor of a disk drive which is relatively strong and relatively easy to edge wind.

The foregoing and other objects, features and advantages of the invention will be apparent from the following more particular description of a preferred embodiment of the invention as illustrated in the accompanying drawing.

BRIEF DESCRIPTION OF THE DRAWING

FIG. 3A illustrates the coil of the prior art VCM shown in FIG. 2.

FIG. 3B illustrates an enlarged section of the coil winding of the coil shown in FIG. 3A taken along the line BB;

FIG. 4 is an enlarged exploded view illustrating the knurl prints on the sections of the edge wound ribbon wire of the present invention;

FIG. 5 is an enlarged view illustrating a tapered knurl print on the surface of the ribbon wire, to improve windability of the coil.

DESCRIPTION OF THE PREFERRED EMBODIMENT

Figure 1:
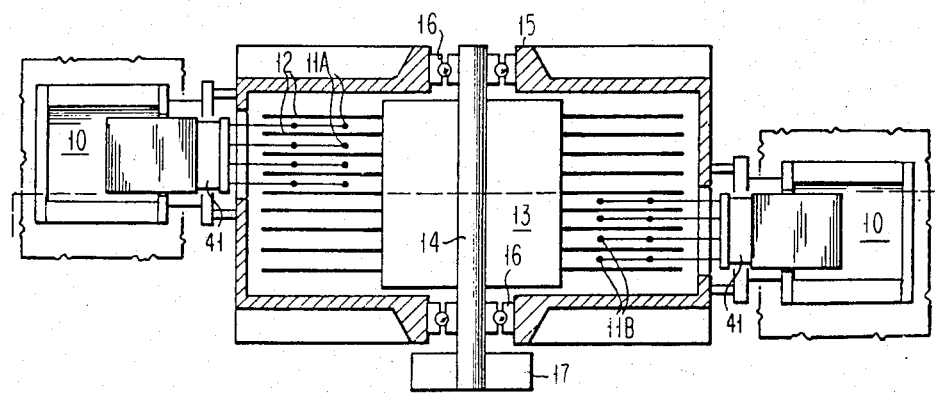
FIG. 1 illustrates a head disk assembly of a prior art disk file.

FIG. 1 illustrates a prior art disk file in which the present invention may be advantageously employed. FIG. 1 corresponds to FIG. 4 of U.S. Pat. No. 4,263,629 and shows a pair of voice coil motors 10 which function to move separate sets of magnetic transducers 11A and 11B in a direction parallel to the direction of the surfaces of disks 12. Disks 12 are attached to hub 13 which, in turn, is attached to rotate with spindle 14 that is mounted on either end to a support member 15 by a pair of bearings 16. Spindle 14 is rotated by pulley 17 which is driven by some suitable source to rotate the disks at a constant R.P.M. in the range of 3,000 to 3,600. This permits the sets of transducers 11A and 11B to be spaced from the surfaces of the disks 12 by a film of air having a spacing in the range of 20 to 40 microinches. As shown, the set of heads 11A and 11B are arranged to start and stop in contact with disks 12.

Figure 2:
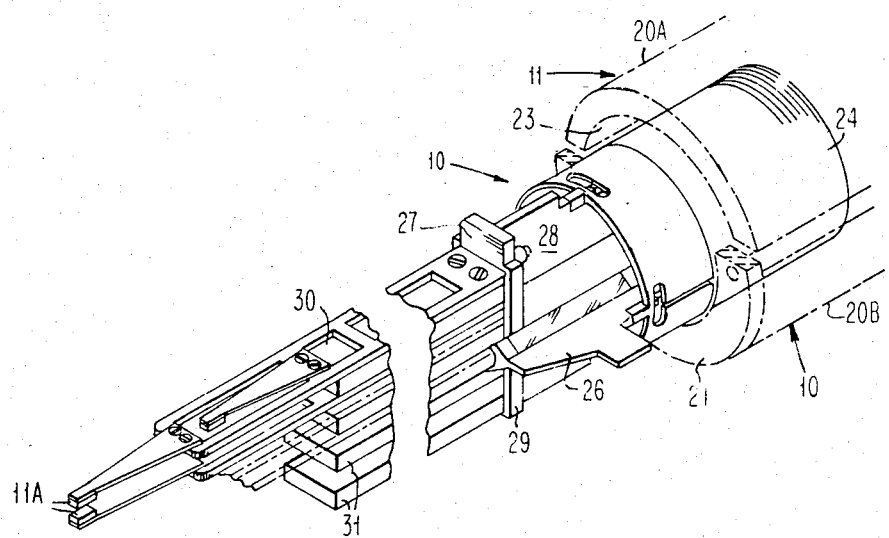
FIG. 2 is a perspective view of the VCM and transducer positioning mechanism shown in block form in FIG. 1.

FIG. 2 illustrates in further detail the arrangement of the magnetic transducers 11 and the VCM 10. FIG. 2 corresponds to FIG. 1 of U.S. Pat. No. 4,144,466. As shown in FIG. 2, the VCM comprises electromagnets 20A and 20B (shown in phantom lines) secured to a front pole piece 21 which, together with a center circular pole piece (not shown), define an air gap 23 in which a circular coil 24 is disposed for axial movement. Coil 24 is attached to a pair of telescoped concentric ring members which function to mount the coil 24 to the carriage 26 and head arm assembly 27 comprising cover 28, plate 29 and arm array 30 comprising four separate head arms 31. It should be understood that by energizing coil 24 with current, the flux in air gap 23 causes movement of the coil 24 and attached carriage assembly 26, as explained in these patents.

As mentioned previously, it is important to move the magnetic transducers to a selected track as quickly as possible. Positioning systems for state of the art disk files generally have average access times in the range of 30 to 70 milliseconds, which corresponds to movements of about one inch in that time period. In most systems, maximum current is applied to cause maximum acceleration to the halfway point, and then the current is reversed to cause maximum deceleration, such that the magnetic transducer stops at the target track. Because of the relatively high track densities employed in state of the art disk files, sophisticated closed loop servo systems are used to control the current during movement of the coil. It will be appreciated that the coil is subjected to maximum force when the current is reversed to cause the system to switch from maximum accleration to maximum deceleration.

FIG. 3A illustrates a prior art coil formed from flat, ribbon type aluminum wire which is edge wound. As shown in FIG. 3A, the coil is edge wound from insulated ribbon wire which is relatively thin compared to its width. For example, a typical ratio of the width W to thickness T (W/T) is 6. The insulation thickness is small compared to the thickness of the wire and has not been illustrated in FIGS. 3B, 4 and 5 to avoid confusion. In practice, the insulation is generally a polyimide type material which is bonded to the aluminum wire. A polyimide type bonding agent is used between turns. When the wire is edge wound, as shown in FIGS. 3A and 3B, extremely thin bond lines 40 are created. The cross-section of the ribbon wire, as shown in FIG. 3B, is substantially rectangular except for, perhaps, a slight rounding at the two side edges 41 and 42 of the wire, referred to as a "dog bone" cross-section. During the process of adding the insulation to the wire, the ends tend to round out and the center sections 46 of the wire necks down. When the wire is wound as a coil, pockets 47 are created between adjacent turns 45 which tend to entrap solvents from the bonding agent and/or byproducts that are generated when the coil is cured.

FIG. 4 is a greatly enlarged exploded section of a coil winding embodying the present invention. FIG. 4 illustrates a section of the coil showing six contiguous turns which have been wound edgewise from a flat ribbon wire which has been knurled before winding. As shown, the knurl prints 70 extend substantially normal to the lengthwise edges 71 of the wire and causes sections 72 of the wire on either side of the knurl print 70 to be bent out of the normal plane of the wire. Adjacent knurl prints 70, as shown in the preferred embodiment, are made on opposite sides of the wire which results in a somewhat corrugated appearance of what is normally flat ribbon type wire.

A preferred spacing of adjacent knurl prints on one surface is in the range of 0.5 to 7 mm., with the depth of the print being approximately 0.01 mm. The angle of corrugation shown in FIG. 4, i.e., the number of degrees that one section is bent from the normal plane of the wire is in a range of 0.2 to 1 degree. Prints 70 on opposite surfaces of the wire are preferably 180° out of phase so as not to alter the overall cross-section of the wire to a point where the electrical resistance is increased to any extent.

After the ribbon wire has been wound to form the coil, the respective knurl prints which now extend in a radial direction provide a series of vents between adjacent turns which are spaced circumferentially around each pair of adjacent turns to permit solvents from the bonding agents to readily escape, and also to permit any byproducts of the bonding agent that might be generated during curing of the coil to also escape as the coil is being cured.

The construction shown in FIG. 4 with the knurl prints also provides for a stronger bond between adjacent turns because of the inherent nature of bonding agents to adhere more readily to rough surfaces better than a smooth surface. It will be appreciated that while the knurl prints 70 are shown being 90° to edges 71, other angles may be employed to create the so-called vents in the coil. Tests have shown that at a 90° angle, an approximate two-fold increase in coil tensile strength is obtained from the knurled wire construction. Coil tensile strength is measured along the coil axis and is a measure of the ability of the coil turns to stay bonded together when subjected to an axial pull.

The windability of the ribbon like wire to form an edge wound coil may also be increased by providing a knurl print that is tapered, as shown in FIG. 5.

The greatly enlarged section of wire shown in FIG. 5 has a tapered knurling print 80 in which the edge 81 of the print corresponding to the outside of the coil is wider than the edge 82 of the print 80 on the wire that is close to the coil axis. The windability of the ribbon wire, when wound edgewise, becomes more difficult as the diameter of the coil decreases. It has been found that by suitable control of the taper of the knurl print relative to the coil diameter, windability for small coil diameters is improved. This is due primarily from the outer edge 83 increasing in length relative to the inner edge 84 of the ribbon wire, which is basically the condition required to improve edge winding of coils on small diameters.

While the invention has been particularly shown and described with reference to a preferred embodiment thereof, it will be understood by those skilled in the art that various changes in the form and details may be made therein without departing from the spirit and scope of the invention.

Having thus described our invention, what we desire to secure by Letters Patent is:

1. In a voice coil actuator having a magnet assembly including an air gap, the inner surface of which is defined by a center pole piece of said magnet assembly, and a coil mounted for axial movement in said air gap in response to current in said coil reacting with the magnetic flux in said air gap, an improved coil comprising an insulated ribbon type wire having a plurality of knurl prints extending in a direction transverse to the length of said wire, said wire being wound edgewise to form a multi-turn coil, and a bonding agent disposed on the flat planar sides of said wire to bond adjacent turns together, whereby the knurl prints on the wound wire are disposed in a generally radial direction relative to the axis of said coil and define a plurality of radially extending vents in said coil to avoid entrapping volatile constituents of said bonding agent or said insulation.

2. The coil set forth in claim 1 in which said plurality of knurl prints are disposed on both sides of said ribbon wire with said prints on one side of said wire being offset with respect to said prints on the other side of said wire.

3. The coil set forth in claim 1 in which said knurl prints are disposed substantially normal to the lengthwise direction of said wire to thereby define a plurality of radially extending circumferentially disposed vents between adjacent turns of said coil.

4. The coil set forth in claim 3 in which said ribbon wire comprises aluminum wire having a substantially rectangular cross-section with an aspect ratio of greater than two and less than ten and includes electrical insulating material of the polyimide type bonded to said wire.

5. The coil set forth in claim 4 in which each said knurl print is tapered, the end of said taper disposed adjacent to the coil axis being smaller than tne end of said taper which is remote from said coil axis.

6. The coil set forth in claim 5 in which said bonding agent is a polyimide type agent that generates volatile byproducts when said coil is thermally cured.

* * * * *